United States Patent
Engländer et al.

[11] Patent Number: 6,149,382
[45] Date of Patent: Nov. 21, 2000

[54] VACUUM PUMP WITH SHAFT BEARING

[75] Inventors: Heinrich Engländer, Linnich; Hans Rudolf Fischer, Erstadt, both of Germany

[73] Assignee: Leybold Vakuum GmbH, Cologne, Germany

[21] Appl. No.: 09/035,474

[22] Filed: Mar. 5, 1998

[30] Foreign Application Priority Data

Mar. 6, 1997 [DE] Germany ............ 197 09 205

[51] Int. Cl.[7] .................................. F01D 1/36
[52] U.S. Cl. .............. 415/90; 415/174.2; 415/231; 384/536; 417/423.4; 29/434; 29/450
[58] Field of Search ............... 415/90, 113, 143, 415/170.1, 174.2, 229, 230, 231; 384/536; 417/423.4, 423.12; 29/888, 888.02, 434, 450

[56] References Cited

U.S. PATENT DOCUMENTS

| | | | |
|---|---|---|---|
| 3,101,979 | 8/1963 | Mard | 384/536 |
| 3,466,104 | 9/1969 | Norrie et al. | |
| 3,897,985 | 8/1975 | Davis et al. | |
| 4,044,977 | 8/1977 | Feucht | |
| 4,806,075 | 2/1989 | Osterstrom et al. | 415/170 R |
| 5,125,755 | 6/1992 | Adler et al. | |

FOREIGN PATENT DOCUMENTS

| | | |
|---|---|---|
| 0196352 A1 | 10/1986 | European Pat. Off. |
| 311 858 | 5/1950 | Germany. |
| PS 903762 | 2/1954 | Germany. |
| PS 915401 | 7/1954 | Germany. |
| PS 934447 | 10/1955 | Germany. |
| AS 1010355 | 6/1957 | Germany. |
| 078 144 | 10/1969 | Germany. |
| 2502323 A1 | 7/1975 | Germany. |
| GM 7832849 | 11/1978 | Germany. |
| 2758741 A1 | 7/1979 | Germany. |
| 2247377 C2 | 5/1983 | Germany. |
| 3537822 A1 | 4/1987 | Germany. |
| 3722997 A1 | 2/1988 | Germany. |

*Primary Examiner*—Edward K. Look
*Assistant Examiner*—Liam McDowell
*Attorney, Agent, or Firm*—Fay, Sharpe, Fagan, Minnich & McKee, LLP

[57] ABSTRACT

A vacuum pump has a shaft bearing (6) supported in a bearing outer ring (8). In order to improve the damping properties a substantially cylindrical radial supporting ring (7) is provided between the outer ring (8) and an interior surface of a bore (9) in a housing (1). First and second circumferential projections (11, 12) project from opposite edges of cylindrical ring (7) on one side. On its other side, a third circumferential projection (13) is axially arranged between the first projections (11, 12). The first and second projections engage one of the outer race and the bore and the third projection engages the other. The damping of the radial support ring (7) is determined by its radial stiffness which is determined by the stiffness of the material and the distance between the projections (11, 12, 13).

13 Claims, 2 Drawing Sheets

VACUUM PUMP WITH SHAFT BEARING

BACKGROUND OF THE INVENTION

The present invention relates to the vacuum pump arts. It finds particular application in a vacuum pump with a shaft bearing. The vacuum pump supports itself via its bearing outer ring and includes a damping means in its housing.

Vacuum pumps which have rapidly rotating rotors tend to vibrate. To reduce the vibration of the vacuum pumps, damping means are provided through shaft bearings. The shaft bearing is also used to support the vacuum pump in its housing. Radial stiffness of the damping means is also of importance in addition to the damping itself.

Vacuum pumps which operate at high speeds and include damping means are well known. For example, two known vacuum pumps with damping means are disclosed in DE-A-37 822 and EU-A 196-342. Pumps of this type are frequently employed in measuring instruments (e.g., electronic microscopes), where vibrations are highly troublesome. With these pumps, the bearings of the rotor shafts support themselves in the pump housing either directly or indirectly through spindle bearings and elastomer rings or elastomer ring systems. These damping means allow general damping behavior through the diameters and material of the rings. Specific damping, however, involves a certain radial stiffness.

The use of O-rings for damping has disadvantages in that O-rings have a shorter life expectancy than bearings and are less homogeneous and are more expensive to manufacture than bearing support rings.

SUMMARY OF THE INVENTION

The present invention provides a new and improved vacuum pump which overcomes the above referenced problems and others. An object of this present invention is providing the damping means of the shaft bearing in such a manner so that influence upon its damping and radial stiffness can be exerted independently from each other.

In accordance with one aspect of the present invention, an essentially cylindrical radial supporting ring is provided as a damping means, which has, on its one side, two axially remote first projections, and on its other side, another projection arranged axially between the first projections. In this radial supporting ring, the radial front surfaces of the projections form support surfaces, which support themselves on the exterior ring of the bearing or on the interior of a housing bore.

In accordance with another aspect of this invention, the damping of the radial supporting ring depends upon its material, while its radial stiffness is determined by the thickness of the ring and by the distance between the projections of the support surfaces. A change in the thickness or the distances thus produces a change in radial stiffness, whereas its damping effect remains substantially unchanged.

One advantage of the present invention is that it provides a damping means where the damping function and the radial stiffness of the damping means are independent of each other.

Another advantage of the present invention is that it enables suppressing certain interfering frequencies.

Still another advantage of the present invention is that the damping and the attainable type of active force are better than with the use of O-rings (lesser noise, longer life expectancy of the bearings).

A still further advantage of the present invention is that manufacture of radial supporting rings is more precise, more homogeneous and less expensive than the manufacture of previously employed precision O-rings.

Still further advantages of the present invention will become apparent to those of ordinary skill in the art upon reading and understanding of the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
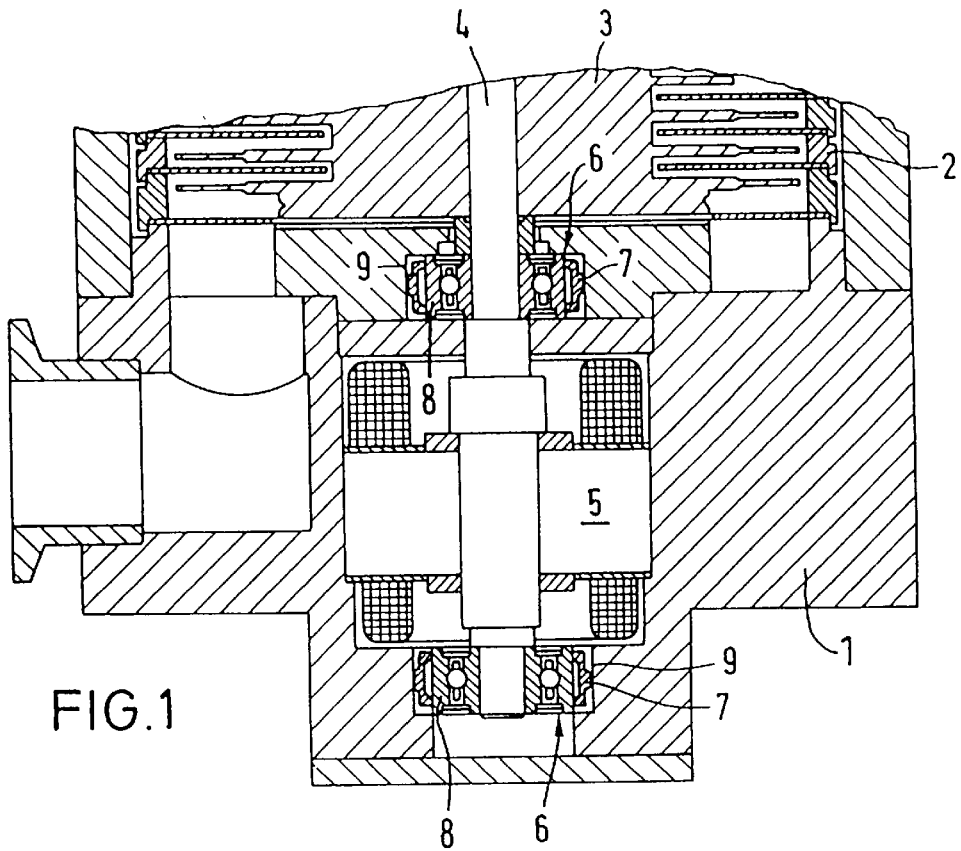
FIG. 1 shows a partial section of a preferred embodiment of a turbo-molecular vacuum pump with bearings of the type in accordance with the present invention.

With reference to FIG. 1, the turbo-molecular vacuum pump includes a housing 1, a stator package 2 arranged therein, a rotor 3 as well as its shaft 4 with driving motor 5. The shaft 4 supports itself in the housing 1 via the bearings 6. Radial supporting rings 7 are assigned to the bearings 6 as damping means. The radial supporting rings 7 support themselves on one side upon the exterior sides of the bearing outer rings 8 and upon the interior wall of the housing bores 9.

Figures 2, 3:
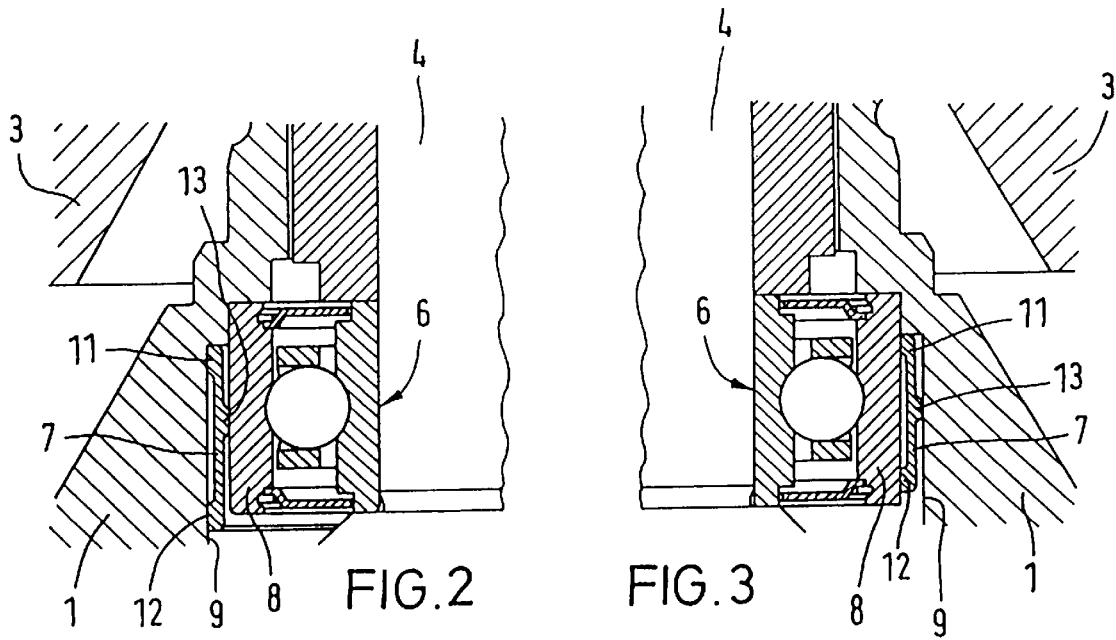
FIG. 2 shows an enlarged cross section of a specific embodiment of the damping means in accordance with the present invention.
FIG. 3 shows an enlarged cross section of a second embodiment of the damping means.

Referring now to FIG. 2, the shape of the cross section profile of a radial supporting ring 7 according to FIG. 1 is apparent from the enlarged representation in FIG. 2. The radial supporting ring 7 has a substantially cylindrical shape and is fitted with a total of three circumferential projections or supporting surfaces 11, 12, 13. Two of the projections 11, 12 are located in the region of the edges of the supporting ring 7 and protrude radially toward the inside from the otherwise cylindrical supporting ring 7. The radial front surfaces of the projections 11, 12 support themselves on the exterior side of the bearing outer ring 8 of the bearing 6. The other projection 13 is located on the opposite side of the ring 7 and is axially spaced between the projections 11, 12 and protrudes toward the outside. The projection 13 supports itself on the inner wall of housing bore 9 surrounding the bearing 6. The cross-section of the radial supporting ring 7 corresponds, in essence, to a beam, upon whose ends (projections 11, 12) the ring 7 is supported and which is burdened from the direction of its other side by projection 13.

The damping of the radial supporting ring 7 depends upon its material. However, the thickness of the ring 7 and/or the distance between the projections 11, 12, 13 determine the radial stiffness of the ring 7.

Synthetic material has proven itself appropriate as material for the radial supporting ring 7. Materials such as polyamidimide, polycarbonate, polyamide and polyimide are particularly suitable.

With reference now to FIG. 3, a specific embodiment is shown where the radial supporting ring 7 supports itself with its two projections 11, 12 upon the bearing outer ring 8. The additional projection 13 is located on the same side as and is axially spaced between the two projections 11, 12 and supports itself upon the inside of the housing bore 9.

Figure 4:
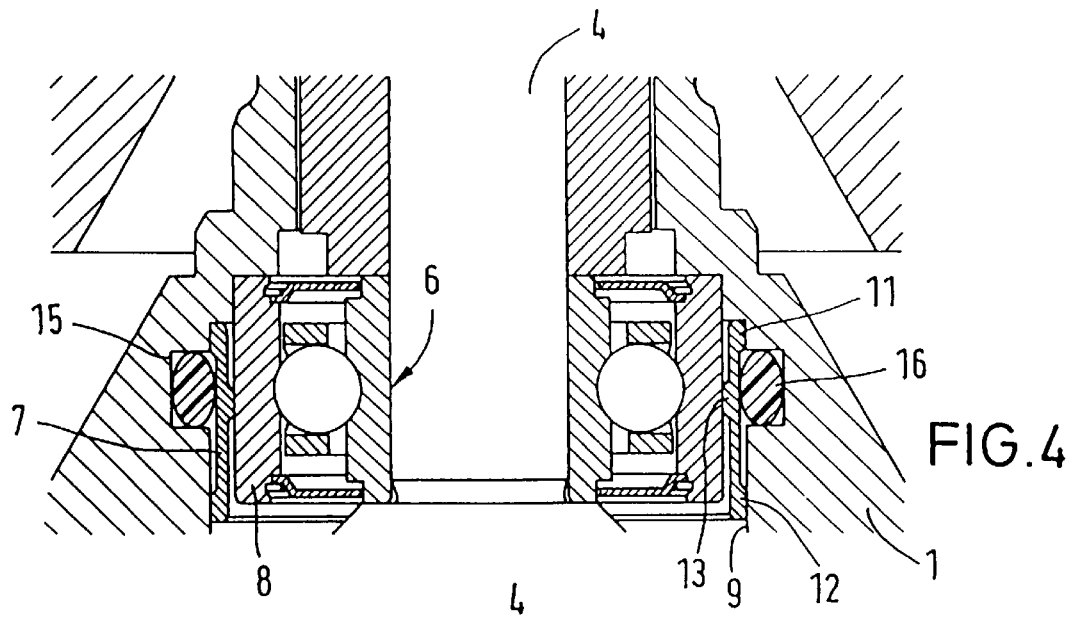
FIG. 4 shows an enlarged cross section of a third embodiment of the damping means.

With reference to FIG. 4, a specific embodiment is shown in which a circumferential groove 15 is provided in the housing bore 9. This bore is located between the projections 11, 12, which support themselves on the inside of the housing bore 9. In the circumferential groove 15 there is an elastomer O-ring 16. The dimensions of the groove 15 and the diameter of the O-ring 16 as well as its material are chosen in such a manner so that the O-ring 16 will have little effect upon the general damping behavior of the radial supporting ring 7. The O-ring 16 secures the radial supporting ring 7 against an axial displacement.

Figure 5:
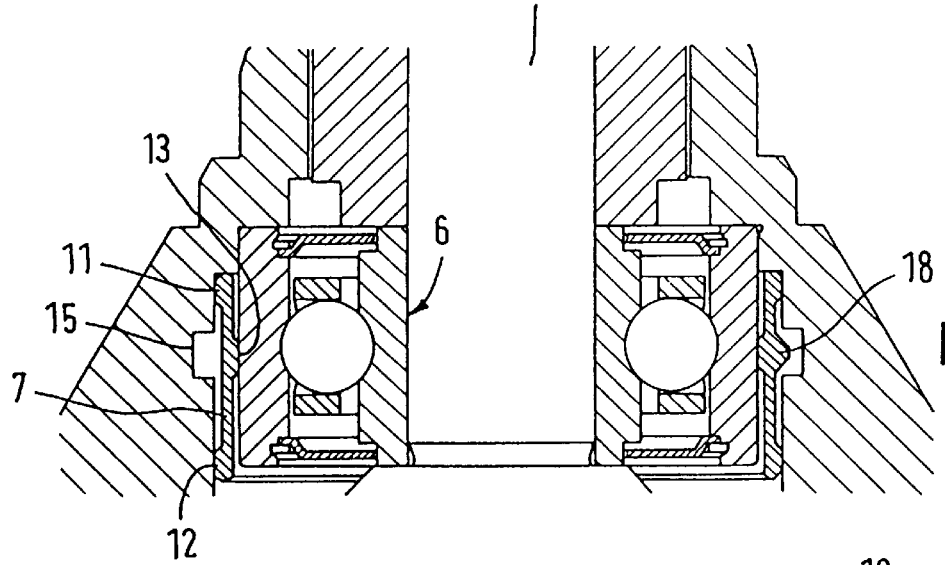
FIG. 5 shows an enlarged cross section of a fourth embodiment of the damping means.
Figure 6:
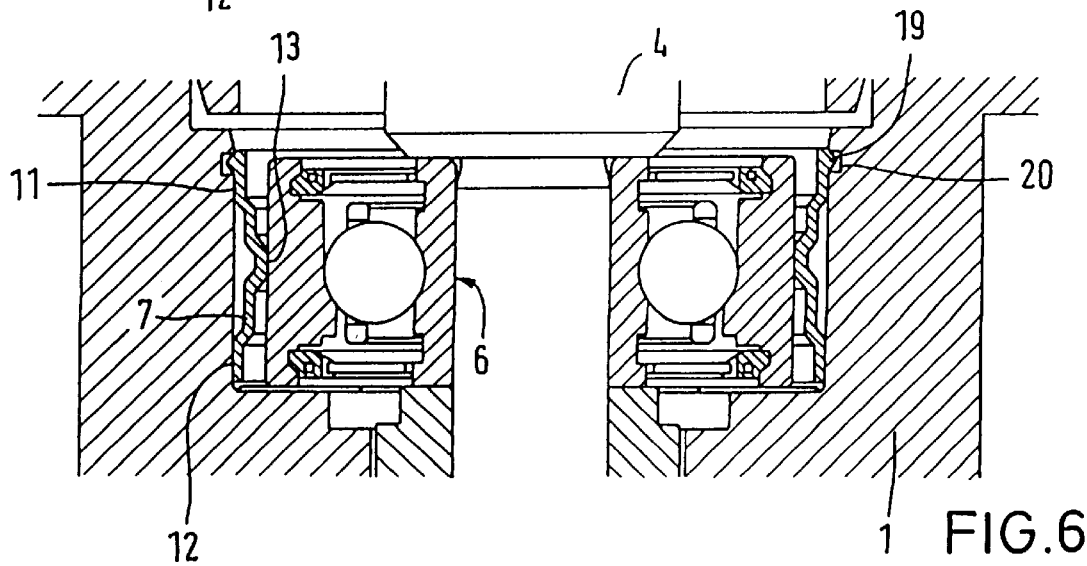
FIG. 6 shows an enlarged cross section of a fifth embodiment of the damping means.

With reference to FIGS. 5 and 6, other embodiments with respect to the radial supporting ring 7 are shown. In the arrangement according to FIG. 5, which is similar to the embodiment shown in FIG. 4, ring 7 is equipped at the height of the circumferential groove 15 with an additional projection 18, which is approximately opposite the projection 13. The projection 18 protrudes into groove 15 without compromising the spring action of ring 7. Projection 18 is used to secure the axial position of ring 7 in lieu of the O-ring 16 shown in FIG. 4.

With reference now to FIG. 6, the ring 7 has multiple stepped supporting surfaces. One supporting surface (11) of the supporting surfaces 11, 12 facing toward the outside, is equipped with a projection 19. Projection 19 protrudes into a circumferential groove 20 and thus secures the axial position of ring 7.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

What is claimed is:

1. A vacuum pump comprising:
   a housing which defines a bore with an interior surface;
   a bearing received in the bore, the bearing including an inner race connected with a rotating shaft, an outer race disposed in a spaced relationship with the bore interior surface, and rolling elements disposed between the inner and outer races;
   a vibration damping ring mounted between the outer race and the bore interior surface, the vibration damping ring including:
      first and second circumferential projections disposed at opposite ends of the damping ring and engaging one of the bearing outer race and the bore interior surface,
      a third circumferential projection disposed centrally along the damping ring and engaging the other of the bearing outer surface and the bore interior surface, and
      cylindrical spring sections disposed between the third circumferential projection and the first and second circumferential projections for absorbing vibration and damping passage of vibration between the housing and the bearing outer race.

2. The vacuum pump according to claim 1, wherein said first and second projections include radial front surfaces, said radial front surfaces support themselves on one of said bearing outer race and said interior surface of said housing bore.

3. The vacuum pump according to claim 1, wherein said vibration damping ring is made of synthetic material.

4. The vacuum pump according to claim 1, further including:
   an elastomer ring which secures said vibration damping ring against an axial displacement.

5. A vacuum pump comprising:
   a housing defining a circumferential groove;
   a bearing outer ring for supporting a shaft bearing;
   a substantially cylindrical radial supporting ring for damping vibration mounted between the bearing outer ring and the housing, said radial supporting ring comprising:
      first, second, and third projections, said first and second projections being axially separated on a first side of said radial supporting ring, said third projection being located on a second opposite side of said radial supporting ring and being positioned axially between said first and second projections; and
   an elastomer ring which secures said radial supporting ring against an axial displacement, said elastomer ring being received in said circumferential groove in said housing.

6. A vacuum pump including a housing in which a shaft bearing is supported by a bearing outer ring and a substantially cylindrical radial supporting ring for damping vibration mounted between the outer bearing ring and the housing, said radial supporting ring comprising:
   first, second, third, and fourth projections, said first and second projections being axially separated on a first side of said radial supporting ring, said third projection being located on a second opposite side of said radial supporting ring and being positioned axially between said first and second projections, said fourth projection engaging a circumferential groove in said housing to secure an axial position of said radial supporting ring.

7. The vacuum pump according to claim 6, wherein said additional projection is disposed opposite to said third projection.

8. The vacuum pump according to claim 6, wherein each of the first and second projections define radial front surfaces and one of said projections is located on one of said radial front surfaces.

9. A vacuum pump including a housing in which a shaft bearing is supported by a bearing outer ring and a substantially cylindrical radial supporting ring for damping vibration mounted between the outer bearing ring and the housing, said radial supporting ring including:
   first, second, and third projections, said first and second projections being axially separated on a first side of said radial supporting ring, said third projection being located on a second opposite side of said radial supporting ring and being positioned axially between said first and second projections, and
   multiple stepped supporting surfaces.

10. The vacuum pump according to claim 1, wherein said vacuum pump is a turbo-molecular vacuum pump.

11. A vacuum pump including a housing in which a shaft bearing is supported by a bearing outer ring and a substantially cylindrical radial supporting ring for damping vibration mounted between the outer bearing ring and the housing, said radial supporting ring being composed of one of: polyamidimide, polycarbonate, polyamide, and polyimide, said radial supporting ring comprising:

first, second, and third projections, said first and second projections being axially separated on a first side of said radial supporting ring, said third projection being located on a second opposite side of said radial supporting ring and being positioned axially between said first and second projections.

12. A method of damping vibration in a vacuum pump from being transmitted between an outer race of a bearing and a vacuum pump housing defining a bore within which the bearing is received, the method comprising:

positioning a cylindrical vibration absorbing element in a spaced relationship between the bearing outer race and an interior surface of the bore;

connecting a central, circumferential portion of the cylindrical element with one of the outer race and the bore interior surface;

connecting opposite circumferential, edge portions of the cylindrical element with the other of the outer race and the bore interior surface;

rotating a rotor portion of the vacuum pump which is at least partially supported by an inner race of the bearing relative to the outer race, causing vibration;

absorbing the vibration with cylindrical spring sections disposed between the circumferential edge portions of the cylindrical element such that the vibration is damped and inhibited from passing between the outer race and the housing.

13. The method as set forth in claim 12 further including:

positioning an annular elastomeric element between the cylindrical element and the housing;

absorbing vibration in the annular elastomeric element.

* * * * *